US009128562B2

(12) United States Patent
Tokutake

(10) Patent No.: US 9,128,562 B2
(45) Date of Patent: Sep. 8, 2015

(54) TERMINAL APPARATUS, DISPLAY SYSTEM, DISPLAY METHOD, AND RECORDING MEDIUM FOR SWITCHING BETWEEN POINTER MODE AND TOUCH-PANEL MODE BASED ON HANDHELD ACTIVATION

(71) Applicant: SONY MOBILE COMMUNICATIONS INC., Tokyo (JP)

(72) Inventor: Kenji Tokutake, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 151 days.

(21) Appl. No.: 13/900,586

(22) Filed: May 23, 2013

(65) Prior Publication Data

US 2013/0321309 A1 Dec. 5, 2013

Related U.S. Application Data

(60) Provisional application No. 61/651,606, filed on May 25, 2012.

(51) Int. Cl.
G06F 3/041 (2006.01)
G06F 3/0346 (2013.01)
H04N 5/44 (2011.01)
(Continued)

(52) U.S. Cl.
CPC ............ *G06F 3/0416* (2013.01); *G06F 1/1694* (2013.01); *G06F 3/0488* (2013.01); *H04N 21/4126* (2013.01); *H04N 21/4222* (2013.01); *H04N 21/42222* (2013.01);
(Continued)

(58) Field of Classification Search
CPC ..... G06F 3/041; G06F 3/0412; G06F 3/0487; G06F 3/048; G06F 3/0488; G06F 3/04815; G06F 3/0346; G06F 3/0416; G06F 1/1694; H04N 5/4403; H04N 5/443; H04N 5/4432; H04N 5/4442; H04N 5/445; H04N 5/232; H04N 5/44582; H04N 21/431; H04N 21/482; H04N 21/4126; H04N 21/4222; H04N 21/42222
USPC ......... 345/173–175, 419, 157–159, 179, 660; 348/333.01, 552; 455/566, 455/556.1–556.2; 725/34; 340/12.22; 382/100; 206/320; 715/863
See application file for complete search history.

(56) References Cited

U.S. PATENT DOCUMENTS 8,260,364 B2 * 9/2012 Kim .............................. 455/566
8,619,100 B2 * 12/2013 Capela et al. .................. 345/660
(Continued)

FOREIGN PATENT DOCUMENTS

JP 2009-10587 A 1/2009

Primary Examiner — Dwayne Bost
Assistant Examiner — Darlene M Ritchie
(74) Attorney, Agent, or Firm — Oblon, McClelland, Maier & Neustadt, L.L.P.

(57) ABSTRACT

To improve ease of operation in a case where a display device and a small terminal apparatus are connected to each other, and coordinated display is performed. When a contact or approach of an object having a size greater than or equal to a threshold value with or toward the surface of a display panel is detected, a video or an instruction corresponding to the motion detected by the motion sensor is output. The display device, on the basis of the video or the instruction that is output, displays a video in which the position of a pointer or the like is changed in response to the motion detected by a motion sensor.

18 Claims, 13 Drawing Sheets

(51) Int. Cl.
*H04N 5/445* (2011.01)
*G06F 3/0488* (2013.01)
*G06F 1/16* (2006.01)
*H04N 21/41* (2011.01)
*H04N 21/422* (2011.01)

(52) U.S. Cl.
CPC .......... *G06F 3/0346* (2013.01); *H04N 5/4403* (2013.01); *H04N 5/445* (2013.01); *H04N 5/44582* (2013.01)

(56) References Cited

U.S. PATENT DOCUMENTS

| | | | |
|---|---|---|---|
| 8,751,973 B2 * | 6/2014 | Han et al. | 715/864 |
| 2002/0137551 A1 * | 9/2002 | Toba | 455/566 |
| 2009/0088204 A1 * | 4/2009 | Culbert et al. | 455/556.1 |
| 2009/0235207 A1 * | 9/2009 | Choi | 715/851 |
| 2009/0245568 A1 * | 10/2009 | Thelen | 382/100 |
| 2010/0007518 A1 * | 1/2010 | Kang et al. | 340/825.72 |
| 2010/0156785 A1 * | 6/2010 | Nakaoka | 345/157 |
| 2010/0265175 A1 * | 10/2010 | Kabasawa et al. | 345/159 |
| 2010/0295785 A1 * | 11/2010 | Lu et al. | 345/159 |
| 2011/0291929 A1 * | 12/2011 | Yamada et al. | 345/158 |
| 2012/0040719 A1 * | 2/2012 | Lee et al. | 455/557 |
| 2012/0050183 A1 * | 3/2012 | Lee | 345/173 |
| 2012/0118773 A1 * | 5/2012 | Rayner | 206/320 |
| 2012/0206414 A1 * | 8/2012 | Tada et al. | 345/175 |
| 2012/0256866 A1 * | 10/2012 | Yu et al. | 345/173 |
| 2012/0260198 A1 * | 10/2012 | Choi et al. | 715/761 |
| 2012/0311507 A1 * | 12/2012 | Murrett et al. | 715/863 |
| 2013/0063345 A1 * | 3/2013 | Maeda | 345/156 |
| 2014/0168494 A1 * | 6/2014 | Hong et al. | 348/333.01 |

* cited by examiner

FIG. 1
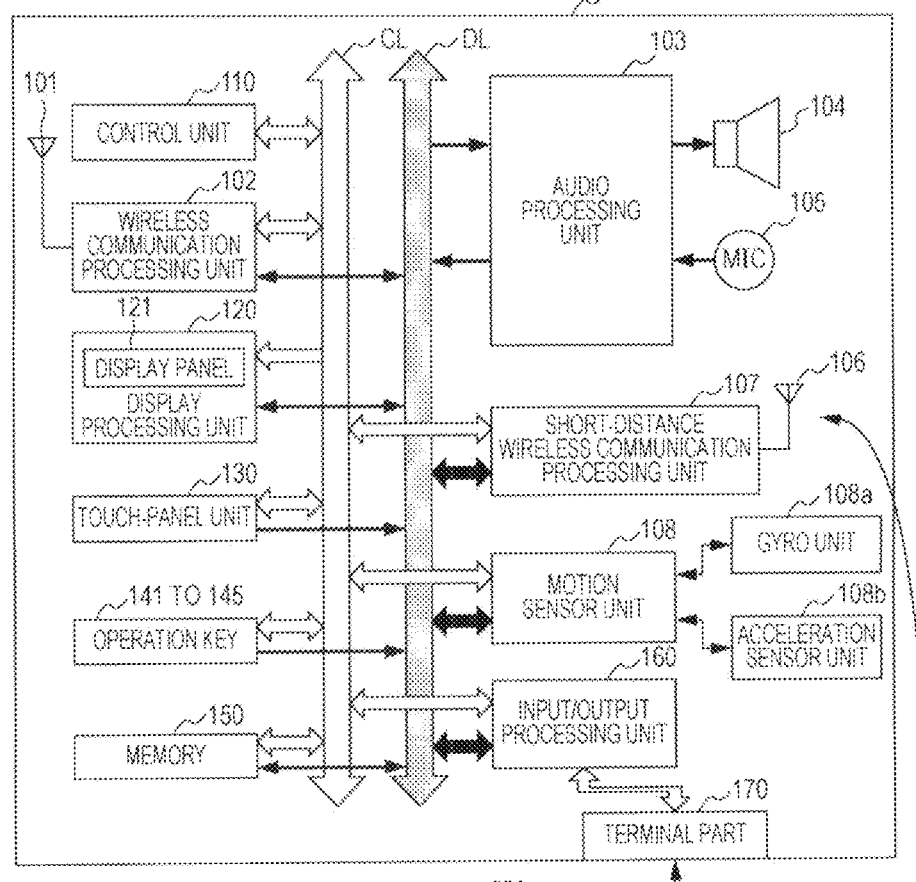
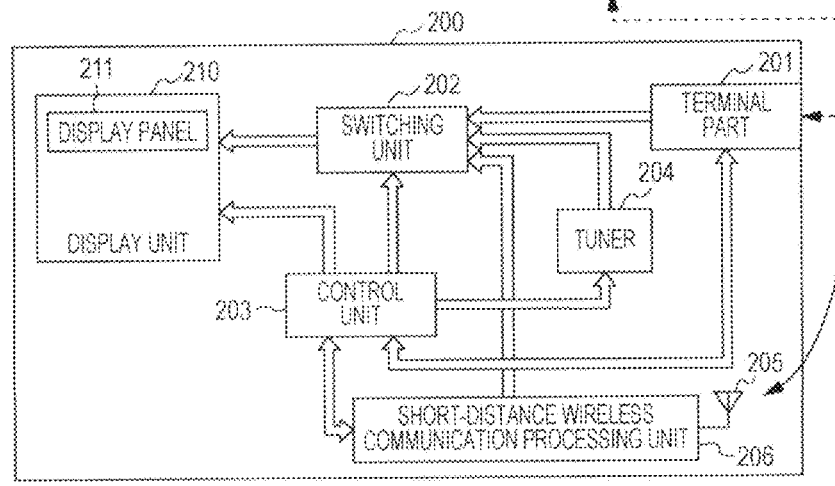

TERMINAL APPARATUS, DISPLAY SYSTEM, DISPLAY METHOD, AND RECORDING MEDIUM FOR SWITCHING BETWEEN POINTER MODE AND TOUCH-PANEL MODE BASED ON HANDHELD ACTIVATION

CROSS REFERENCE TO RELATED APPLICATIONS

The present application claims the benefit of the earlier filing date of U.S. Provisional patent application 61/651,606, filed in the USPTO on May 25, 2012, the entire contents of which being incorporated herein by referenced.

TECHNICAL FIELD

The present disclosure relates to a terminal apparatus including a display unit, a display system in which the terminal apparatus and a display device are combined, a display method that is applied to the terminal apparatus, and a recording medium.

BACKGROUND ART

In recent years, mobile phone terminal devices having high functionality, which are called smartphones, have become popular. Smartphones, which include a display panel having a comparatively high resolution, can display moving images and still images. It is possible for the display panel to display, for example, a video captured using a camera function incorporated into the smartphone, with a high resolution. Alternatively, a smartphone accesses the Internet, making it possible for the display panel to display a video obtained from various home pages.

Furthermore, some smartphones include a video output unit. Some video output units provided in smartphones include a terminal for an interface of, for example, the HDMI (High-Definition Multimedia Interface) standard. A terminal of the HDMI standard is a terminal from which high resolution video data, such as, for example, horizontal 1920 pixels× vertical 1080 pixels, which are the numbers of pixels of one screen, is output.

Such a video output terminal of the HDMI standard for a smartphone is connected to the video input terminal of a display device, such as a television receiver or a computer screen, by using a transmission cable of the HDMI standard. Thus, it is possible for the display device to expand and display the same video as the video being displayed on the display panel of the smartphone itself.

Furthermore, it has been proposed that a smartphone includes a wireless video output unit, and a video is transmitted to a display device by wireless transmission. That is, a smartphone has incorporated thereinto a short-distance wireless communication function that performs wireless communication with adjacent devices. By using this short-distance wireless communication function, it is possible to transmit a video to a display device wirelessly.

PTL 1 discloses a mobile phone terminal device including a terminal of the HDMI standard.

CITATION LIST

Patent Literature

[PTL 1] Japanese Unexamined Patent Application Publication No. 2009-10587

SUMMARY

Smartphones are designed so that various operations can be performed using the touch panel. For example, when a home page obtained by the smartphone by accessing the Internet is displayed, an operation of inputting characters in accordance with the home page being displayed or an operation of moving to another associated screen, is performed by a user by performing a touch operation on the display screen.

Even in the case where the video output by the smartphone in the manner described above is being displayed by another display device, it is possible for the user to perform various operations associated with the display by performing touch operations on the display screen of the smartphone. However, touch operations of touching the display screen of the smartphone have a problem in that operation is not always easy to perform depending on the manner in which the operation is to be performed. For example, in a state in which the video output by the smartphone is expanded and displayed on another display device, it is necessary that the user performs a touch operation of touching the display screen of the smartphone while viewing the video that is expanded and displayed on the display device. For this reason, it is necessary for the user to perform an operation while alternately viewing the video expanded and displayed on the display device and the video of the comparatively small screen of the smartphone. Thus, performing a touch operation does not lead to improved ease of operation.

The inventors have recognized the necessity of improving the ease with which an operation is performed in a case where an operation related to the display video when the video output by the terminal apparatus is to be displayed on another display device.

A terminal apparatus according to the present disclosure includes a display panel arranged on a housing; a display processing unit that processes a video displayed on the display panel; an output unit; a touch-panel unit that detects a contact or approach of an object with or toward a surface of the display panel; a motion sensor; and a control unit.

The output unit externally outputs a video processed by the display processing unit or an instruction regarding a video.

The control unit performs control such that when the touch-panel unit detects the contact or approach of the object having a size greater than or equal to a threshold value, the output unit outputs a video or an instruction corresponding to the motion detected by the motion sensor.

A display system according to the present disclosure includes a terminal apparatus and a display device.

The terminal apparatus includes a display panel arranged on a housing;

a display processing unit that processes a video displayed on the display panel;

an output unit that outputs a video processed by the display processing unit;

a touch-panel unit;

a motion sensor; and a control unit. The control unit performs control corresponding to the motion detected by the motion sensor when the touch-panel unit detects a contact or approach of an object of a size greater than or equal to a threshold value.

The display device displays a video output by the output unit of the terminal apparatus. Then, under the control of the control unit of the terminal apparatus, a display device displays the video that is changed in response to the motion detected by the motion sensor.

A display method according to the present disclosure performs a display process of displaying a video on a display panel, an output process of outputting the video from an output unit, and a control process. The control process causes the output unit to output a video or an instruction corresponding to the motion detected by the motion sensor when a contact or approach of an object of a size greater than or equal to a threshold value with or toward the surface of the display panel is detected.

A recording medium according to the present disclosure is a recording medium having recorded thereon a program for causing a computer to execute a program, and includes a display process of displaying a video on a display panel;

an output process of outputting a video from an output unit; and a control process of controlling output from the output unit. When the contact or approach of an object of a size greater than or equal to the threshold value with or toward the surface of the display panel is detected, the control procedure causes the output unit to output a video or an instruction corresponding to the motion detected by a motion sensor.

According to the present disclosure, in the terminal apparatus, when the contact or approach of an object of a size greater than or equal to the threshold value to the surface of the display panel is detected, the video or the instruction corresponding to the motion detected by the motion sensor is output. For this reason, it becomes possible for the user to perform control regarding the video being output by performing a motion, such as swinging the terminal apparatus in a state in which the user holds the terminal apparatus in such a manner as to cover the surface of the display panel. Furthermore, by only changing the way of holding the terminal apparatus so as to hold the terminal apparatus in such a manner as to cover the surface of the display panel, the terminal apparatus is automatically switched to a state in which control can be performed by such motion, providing the advantages that the user does not need to perform a switching operation.

BRIEF DESCRIPTION OF DRAWINGS

FIG. 1 is a block diagram illustrating a configuration example of a terminal apparatus and a display device according to a first embodiment of the present disclosure.

DESCRIPTION OF EMBODIMENTS

Figure 2:
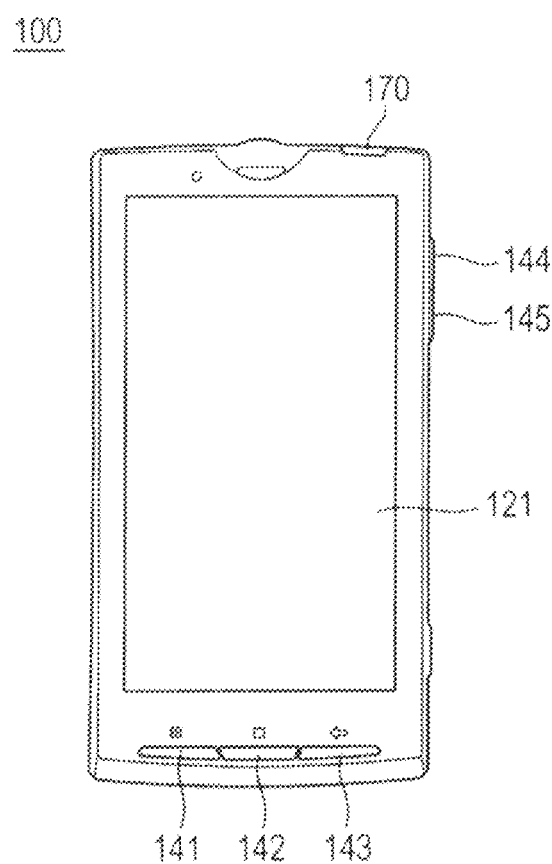
FIG. 2 is a diagram illustrating an example of the outer shape according to the first embodiment of the present disclosure.

Examples of a terminal apparatus, a display system, a display method, and a recording medium according to embodiments of the present disclosure will be described below in the following order with reference to the drawings.
1. First Embodiment
1-1. Configuration of terminal apparatus (FIG. 1, FIG. 2)
1-2. Examples of operation states (FIG. 3)
1-3. Control process based on operation (FIGS. 4 to 7)
1-4. Examples of specific operations and displays (FIGS. 8 to 10)
2. Second Embodiment
2-1. Control process based operation (FIG. 11)
2-2. Examples of specific operations (FIG. 12)
3. Modifications (FIG. 13).
<1. First Embodiment>
[1-1. Configuration of Terminal Apparatus]

FIG. 1 illustrates a configuration of a mobile phone terminal device 100 and a display device 200 of the present disclosure.

The mobile phone terminal device 100 is a highly functional terminal device, which will be referred to as, for example, a smartphone. The display device 200 is, for example, a television receiver.

The mobile phone terminal device 100 includes an antenna 101 for performing wireless communication with a base station for wireless telephone. The antenna 101 is connected to a wireless communication processing unit 102. The wireless communication processing unit 102, under the control of the control unit 110, performs processes of transmitting and receiving a wireless signal. The control unit 110 transmits a control instruction to the wireless communication processing unit 102 through a control line CL. The control unit 110 reads a program (software) stored in a memory 150 through the control line CL and executes the program, thereby controlling each unit of the mobile phone terminal device 100. In the memory 150 included in the mobile phone terminal device 100, data that is prepared in advance, such as a program, is stored and also, data generated by user operation is stored. In the memory 150, storage and reading of data are performed under the control of the control unit 110.

During voice phone call, voice data for phone call, which is received by the wireless communication processing unit 102, is supplied to an audio processing unit 103 through a data line DL. The audio processing unit 103 performs a demodulation process on the supplied voice data so as to obtain an analog audio signal. The analog audio signal obtained by the audio processing unit 103 is supplied to a speaker 104, whereby audio is output from the speaker 104.

Furthermore, during the voice phone call, the audio processing unit 103 converts the audio signal output by the microphone 105 into voice data of a transmission format. Then, the voice data converted by the audio processing unit 103 is supplied to the wireless communication processing unit 102 through the data line DL. Furthermore, the voice data supplied to the wireless communication processing unit 102 is packetized and transmitted in a wireless manner.

In a case where data communication or transmission/reception of mail via a network, such as the Internet, is to be performed, the wireless communication processing unit 102 performs transmission and reception processes under the control of the control unit 110. For example, the data received by the wireless communication processing unit 102 is stored in the memory 150, and a process, such as display, based on stored data is performed under the control of the control unit 110. Furthermore, the data stored in the memory 150 is supplied to the wireless communication processing unit 102, whereby the data is wirelessly transmitted. In a case where the data of the received mail is to be discarded, the control unit 110 deletes the data stored in the memory 150.

The mobile phone terminal device 100 includes a display processing unit 120. The display processing unit 120, under the control of the control unit 110, displays video and various information on a display panel 121. Furthermore, regarding video to be output to the outside, the display processing unit 120 generates it under the control of the control unit 110. For the display panel 121, for example, a liquid-crystal display panel or an organic EL (Electro-Luminescence) display panel is used.

Furthermore, the mobile phone terminal device 100 includes a touch-panel unit 130. When the surface of the display panel 121 is touched by an object, such as a finger or a pen, the touch-panel unit 130 detects the touch position. For the touch-panel unit 130, for example, an electrostatic capacitance type touch panel is used. An electrostatic capacitance type touch panel can detect a state in which a finger or the like directly touches the surface of the display panel 121 and also, can detect a state in which a finger or the like approaches the surface of the display panel 121. A case where touch detection is mentioned in the following description may be either a case in which the surface of the display panel 121 is directly touched and an operation is performed, or a case in which an operation is performed as a result of a finger approaching the surface of the display panel 121.

The data on the touch position detected by the touch-panel unit 130 is transmitted to the control unit 110. The control unit 110 executes the application to be started on the basis of the supplied touch position.

The mobile phone terminal device 100 includes operation keys 141 to 145. The operation information of the operation keys 141 to 145 is transmitted to the control unit 110. An example of specific arrangement states of the operation keys 141 to 145 will be described later.

Furthermore, the mobile phone terminal device 100 includes a short-distance wireless communication processing unit 107 to which an antenna 106 is connected. The short-distance wireless communication processing unit 107 performs short-distance wireless communication with adjacent terminal devices and an access point. The short-distance wireless communication processing unit 107 performs wireless communication with another party in a range of, for example, approximately several tens of meters by applying a wireless LAN (Local Area Network) method defined by, for example, the IEEE 802.11 standard.

The mobile phone terminal device 100 of the present disclosure can transmit the video being displayed on the display panel 121 by the display processing unit 120 to an external display device in the wireless communication in which the short-distance wireless communication processing unit 107 is used. Furthermore, the mobile phone terminal device 100 can transmit various instructions and control signals, which are associated with the video, in the wireless communication in which the short-distance wireless communication processing unit 107 is used. As described above, the short-distance wireless communication processing unit 107 functions as an output unit that outputs video and instructions to the display device through wireless transmission.

In addition, the mobile phone terminal device 100 includes a motion sensor unit 108. The motion sensor unit 108 judges the state of the mobile phone terminal device 100 on the basis of the detection data of a gyro unit 108a and an acceleration sensor unit 108b. The gyro unit 108a detects the magnitudes of angular velocities of three directions: vertical, horizontal, height. The acceleration sensor unit 108b detects the magnitudes of accelerations of three directions: vertical, horizontal, height. The angular velocities and accelerations that are detected by these sensor units are angular velocities and accelerations that are applied to the housing forming the mobile phone terminal device 100.

The data on the state of the mobile phone terminal device 100, which is detected by the motion sensor unit 108, is supplied to the control unit 110.

Furthermore, the mobile phone terminal device 100 includes an input/output processing unit 160. A terminal part 170 is connected to the input/output processing unit 160. The input/output processing unit 160 performs data input and output processes with the outside through a transmission cable 300 connected to the terminal part 170. The terminal part 170 is, for example, an output terminal for the interface of the HDMI (High-Definition Multimedia Interface) standard. The terminal part 170, which is an output terminal for the interface of the HDMI standard, is a terminal that outputs, to the connected transmission cable, high resolution video data, such as, for example, 1920 horizontal pixels×1080 vertical pixels as the number of pixels of one screen, and audio data accompanying the video data. The video data output by the terminal part 170 is, for example, created by the display processing unit 120. Furthermore, the terminal part 170 can transmit and receive a control instruction or the like by using a CEC (Consumer Electronics Control) line defined by the HDMI standard.

Next, the configuration of the display device 200 shown in FIG. 1 will be described.

The display device 200 is configured as, for example, a television receiver. The display device 200 includes a terminal part 201. The terminal part 201 is made to be, for example, an input terminal for the interface of the HDMI standard. The video data obtained at this terminal part 201 is supplied to the switching unit 202. The switching unit 202 selects any one of the video data output by the terminal part 201, the video data output by a tuner 204, and the video data output by the short-distance wireless communication processing unit 206. The selection in this switching unit 202 is performed under the control of the control unit 203. The tuner 204 is a tuner that receives broadcast waves of television broadcasts or the like so as to obtain video data. The display device 200 may include, in place of the tuner 204, a receiving unit that obtains moving images and still images through the Internet.

The short-distance wireless communication processing unit 206 performs short-distance wireless communication with adjacent terminal apparatuses and an access point. In order that this short-distance wireless communication is performed, an antenna 205 is connected to the short-distance wireless communication processing unit 206. The short-distance wireless communication processing unit 206 performs communication in the same wireless communication scheme (for example, the wireless LAN scheme) as that of the short-distance wireless communication processing unit 107 of the mobile phone terminal device 100.

Then, the video data selected by the switching unit 202 is supplied to the display unit 210. The display unit 210 includes a large display panel 211 when compared with the display panel 121, and performs a process for displaying a video on the display panel 211 on the basis of the video data. At the time of operation description (to be described later), the switching unit 202 of the display device 200 is in a state in which the video received by the short-distance wireless communication processing unit 206 is selected.

FIG. 2 illustrates an example of the shape of the mobile phone terminal device 100.

The mobile phone terminal device 100 configured as a smartphone is arranged with a display panel 121 on the surface of a portrait housing. The display panel 121 has, for example, a length of a diagonal line of approximately 10 centimeters. Display on this display panel 121 is performed by the driving by the display processing unit 120. Furthermore, the touching on the surface of the display panel 121 with a finger or the like is detected by the touch-panel unit 130.

Furthermore, the mobile phone terminal device 100 is arranged with three operation keys 141 to 143 on the surface of the portrait housing in the lower side of the display panel 121. On the side surface of the mobile phone terminal device 100, an operation key 144 serving as an up key, and an operation key 145 serving as a down key are arranged.

In addition, a terminal part 170, which is an output terminal for the interface of the HDMI standard, is arranged in the upper end portion of the mobile phone terminal device 100. This terminal part 170 includes a terminal cover, and the terminal cover is uncovered when a cable is connected.

[1-2. Examples of Operation States]

A description will be given of the overview of an operation state in which the short-distance wireless communication processing unit 107 of the mobile phone terminal device 100 and the short-distance wireless communication processing unit 206 of the display device 200 are wirelessly connected to each other, and the display device 200 displays a video output from the mobile phone terminal device 100.

Figure 3A:
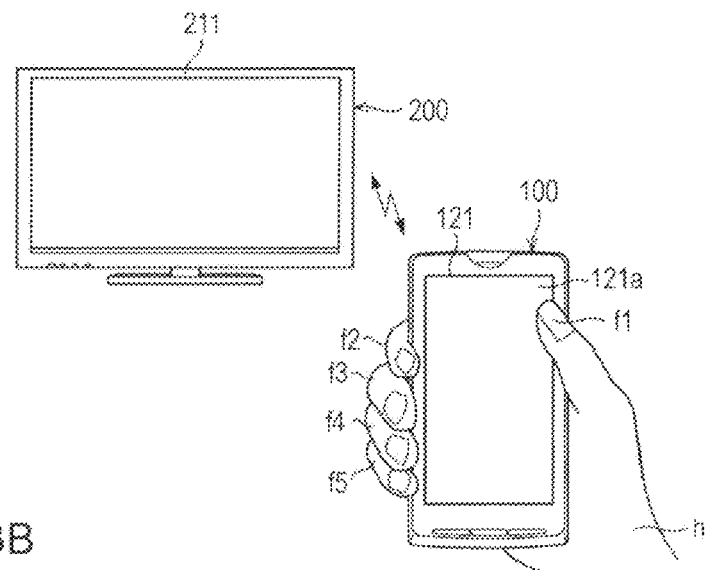
FIGS. 3A and 3B are illustrations illustrating an operation example according to the first embodiment of the present disclosure.
Figure 3B:
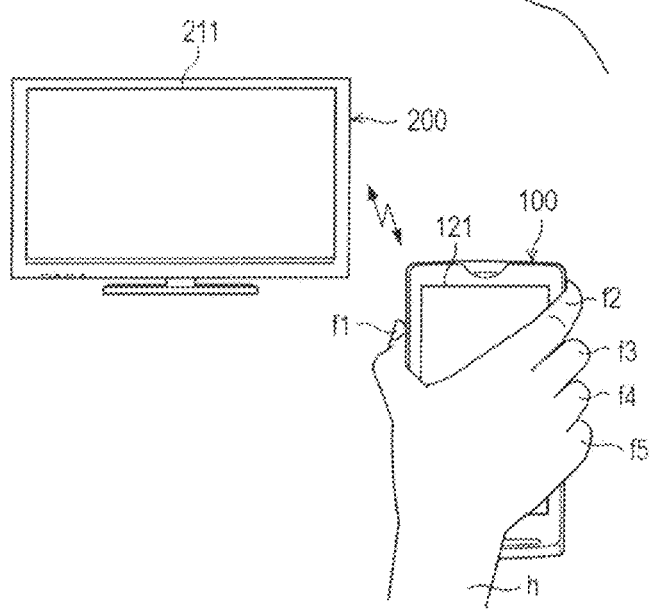

FIGS. 3A and 3B illustrate operation examples in a case where the mobile phone terminal device 100 of the present disclosure is arranged in the vicinity of the display device 200, and the display device 200 displays a video output from the mobile phone terminal device 100.

FIGS. 3A and 3B illustrate an example in which, while holding the mobile phone terminal device 100 with one hand h, the user touches the surface of the display panel 121 of the mobile phone terminal device 100 by using the thumb f1, thereby performing a touch operation. In this example, the fingers f2 to f5 other than the thumb f1 are positioned on the rear side of the mobile phone terminal device 100, and the user holds the mobile phone terminal device 100 by using these fingers f2 to f5 and part of the palm of the hand.

Then, for example, the display panel 211 of the display device 200 displays the video output from the mobile phone terminal device 100. The video to be displayed by the display panel 211 of the display device 200 may be either the same video as a video displayed by the display panel 121 of the mobile phone terminal device 100, or a dedicated video, which is generated so that the video is displayed on the display device 200.

At this time, in a case where there was a touch operation on the surface of the display panel 121, the video displayed by the display panel 211 of the display device 200 is changed to a video that reflects the touch operation. For example, the display position of the pointer (cursor) in the video displayed by the display panel 211 of the display device 200 is changed in response to the touch position that is detected by the touch-panel unit 130 of the mobile phone terminal device 100. The operation of the position of the pointer is an example, and it is possible for the user to perform operations regarding various display video with the touch operation of the display panel 121. In the operation state shown in FIG. 3A, only the thumb f1 is positioned on the display panel 121 of the mobile phone terminal device 100, and most of the surface of the display panel 121 is not covered with fingers or the like.

Then, the mobile phone terminal device 100 of the present disclosure is changed from the state shown in FIG. 3A to a state in which the operation by the motion of the mobile phone terminal device 100 itself is possible by holding the mobile phone terminal device 100 by the user so that the palm of the hand is positioned on the obverse side of the mobile phone terminal device 100. FIG. 3B illustrates a state in which the user holds the mobile phone terminal device 100 at this time.

That is, as shown in FIG. 3B, the user holds the mobile phone terminal device 100 in a state in which the fingers f2 to f5 other than the thumb f1 and the palm of the hand cover the surface of the display panel 121 of the mobile phone terminal device 100.

When the fact that the state shown in FIG. 3B is reached is detected by the touch-panel unit 130 in the mobile phone terminal device 100, the control unit 110 of the mobile phone terminal device 100 controls display on the display panel 211 of the display device 200 on the basis of the motion detected by the motion sensor unit 108. The determination that the state shown in FIG. 3B is reached is performed, for example, on the basis of the detection of the area of the surface of the display panel 121 that is covered on the touch-panel unit 130.

In the state shown in FIG. 3B, the display panel 121 of the mobile phone terminal device 100 does not perform display, and the touch-panel unit 130 performs only the touch detection. Specific examples of these control states will be described later. In the following description, a state in which a touch operation shown in FIG. 3A is performed will be referred to as an ordinary touch input mode, and a state in which an operation is performed by motion with the surface of the display panel 121 being covered with fingers as shown in FIG. 3B will be referred to as a motion input mode.

[1-3. Control Process Based on Operation]

Next, specific control processes through which operations shown in FIG. 3 are realized will be described.

Figure 4:
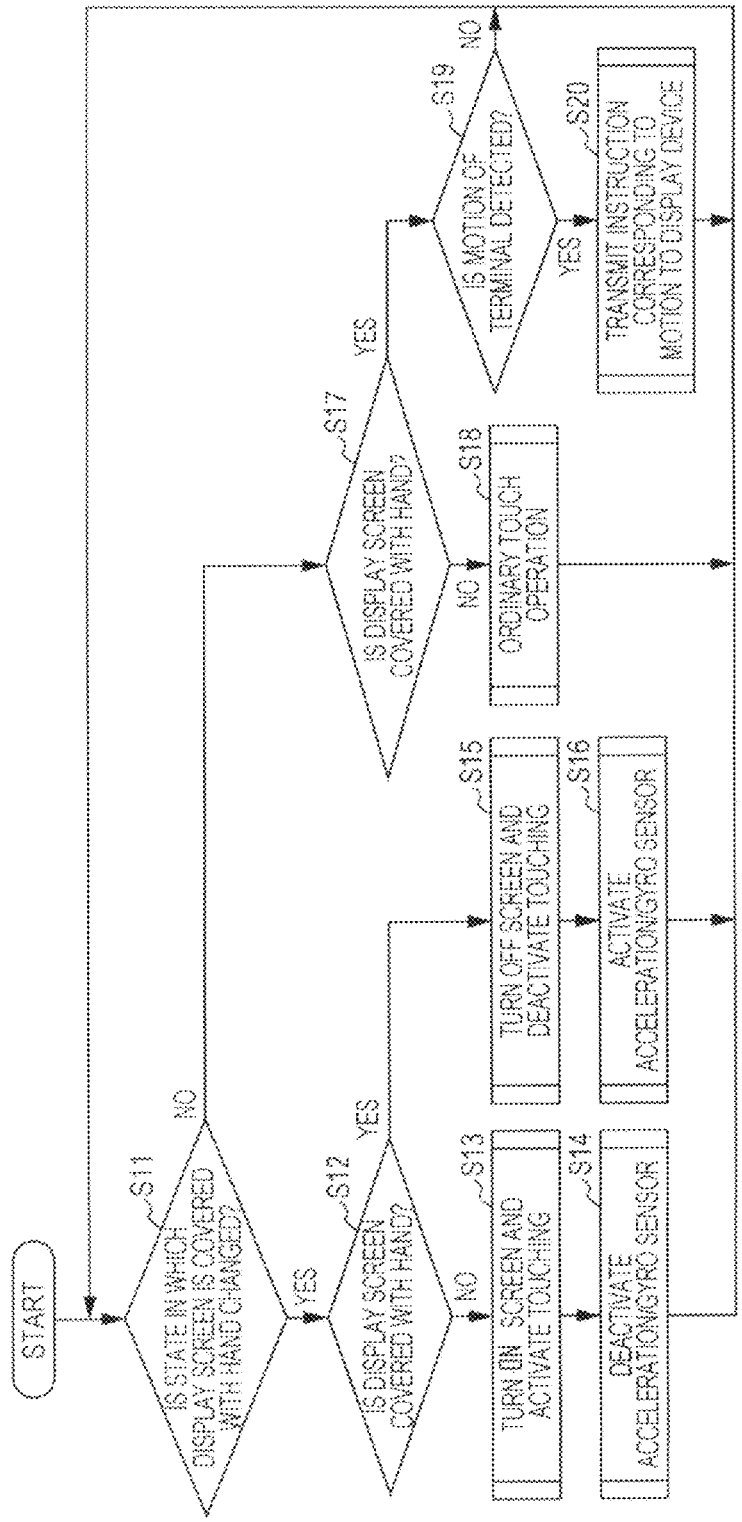
FIG. 4 is a flowchart illustrating a control example according to the first embodiment of the present disclosure.

FIG. 4 is a flowchart illustrating a control process performed by the control unit 110 of the mobile phone terminal device 100. Initially, the control unit 110 determines whether or not there is a change from the touch state detected by the touch-panel unit 130 to a state in which the display panel 121 is covered with the hand (step S11). The change of the state in which the display panel 121 is covered with the hand is performed by the touch-panel unit 130 by detecting which degree of area of the surface of the display panel 121 is covered by an object, such as fingers. Specifically, for example, when the touch-panel unit 130 detects that 50% or more of the surface of the display panel 121 is covered, the control unit 110 determines that the surface of the display panel 121 is covered with the hand. 50% as a threshold value for performing the determination is an example, and another value may be set. Furthermore, the touch-panel unit 130 may detect another touch state other than the touched area, and may detect that the touch-panel unit 130 is covered with the hand.

Then, when it is determined in step S11 that there is a change in the state in which the display panel 121 is covered by the hand, the control unit 110 determines whether or not the present state is a state in which the touch-panel unit 130 is covered with the hand (step S12). When it is determined here that the touch-panel unit 130 is not covered with the hand, the control unit 110 starts the display on the display panel 121, and activates the touch detection in the touch-panel unit 130 (step S13). In a case where the display panel 121 is a liquid-crystal display panel, the control unit 110 causes the backlight to be turned on in synchronization with the start of the display. Furthermore, the control unit 110 deactivates the motion detection of the mobile phone terminal device 100 in the motion sensor unit 108 (step S14). After the process of step S14 is performed, the control unit 110 returns to the determination of step S11.

Furthermore, when it is determined in step S12 that the touch-panel unit 130 is covered with the hand, the control unit 110 completes the display on the display panel 121, and deactivates the touch detection in the touch-panel unit 130 (step S15). In a case where the display panel 121 is a liquid-crystal display panel, the control unit 110 causes the backlight to be turned off in synchronization with the ending of the display. Furthermore, the control unit 110 activates the motion detection of the mobile phone terminal device 100 in the motion sensor unit 108 (step S16). After the process of step S16 is performed, the control unit 110 returns to the determination of step S11.

Then, when it is determined in step S11 that there is no change in the state in which the display panel 121 is covered with the hand, the control unit 110 determines whether or not the present state is a state in which the touch-panel unit 130 is covered with the hand (step S17). When it is determined here that the touch-panel unit 130 is not covered with the hand, the control unit 110 performs a control process of a display video based on the touch detection in the touch-panel unit 130 (step S18). After the process of step S18 is performed, the control unit 110 returns to the determination of step S11.

Furthermore, when it is determined in step S17 that the touch-panel unit 130 is covered with the hand, the control unit 110 determines whether or not the motion sensor unit 108 has detected the motion of the mobile phone terminal device 100 (step S19). When it is determined here that the motion sensor unit 108 has detected the motion of the mobile phone terminal device 100, the control unit 110 transmits an instruction corresponding to the detected motion to the display device 200 (step S20). Then, after the process of step S20 is performed and when the motion sensor unit 108 does not detect the motion in step S19, the control unit 110 returns to the determination of step S11.

Figure 5:
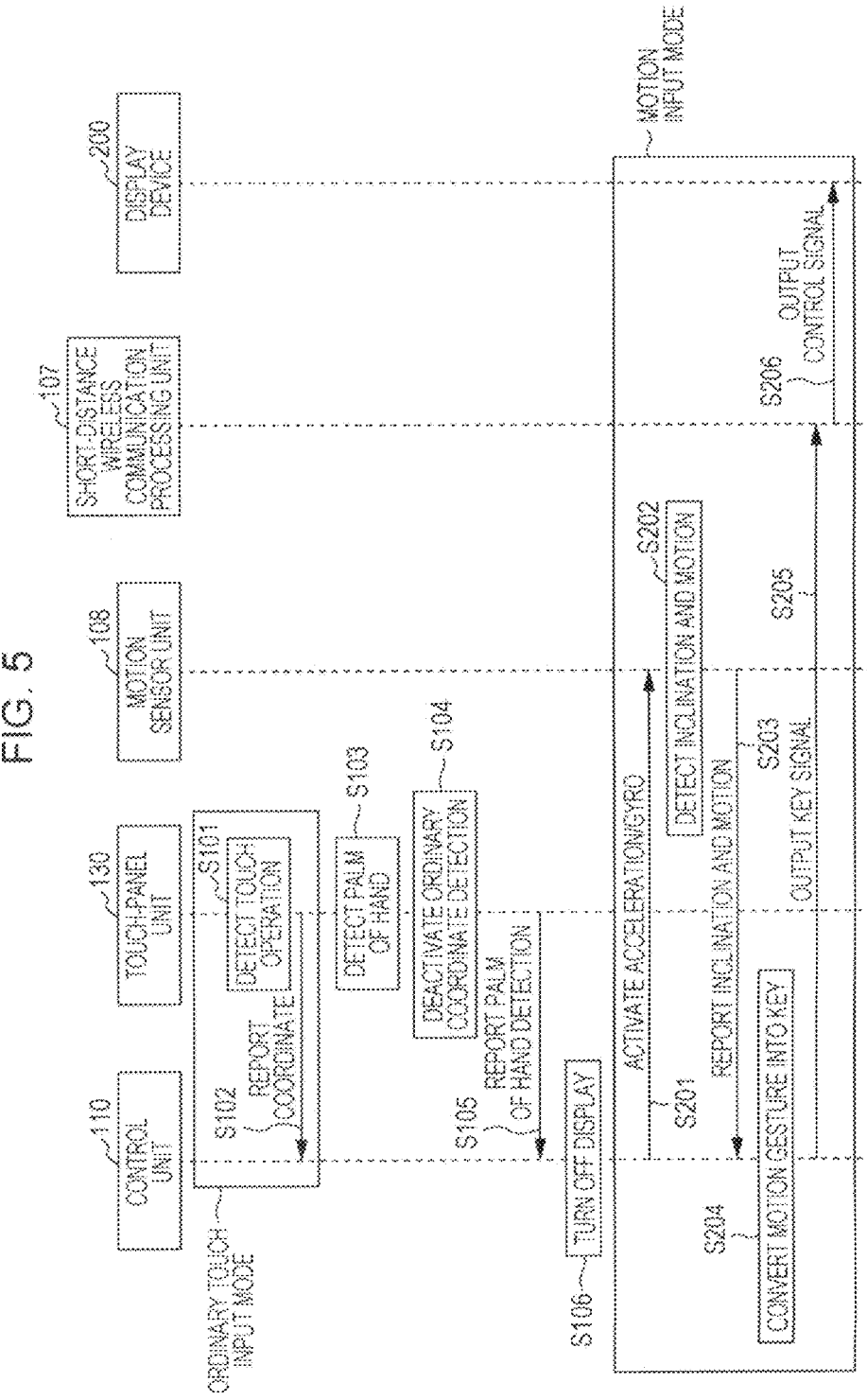
FIG. 5 illustrates the flow of the control state according to the first embodiment of the present disclosure.

FIG. 5 illustrates a flow of the process of each unit in the mobile phone terminal device 100. At the initial timing of the process of FIG. 5, the user is in a state of holding the mobile phone terminal device 100 as shown in FIG. 3A. In this state, the mobile phone terminal device 100 is operating in the ordinary touch input mode. During the operation in the ordinary touch input mode, when the touch-panel unit 130 detects a touch operation (step S101), the coordinate report indicating the detected touch coordinate position is transmitted from the touch-panel unit 130 to the control unit 110 (step S102). The control unit 110 determines which place of the display image was touched on the basis of the transmitted coordinate report, and performs a process on the basis of the determination. The description of the processing performed by the control unit in the ordinary touch input mode is omitted.

After that, the user changes the state of having the mobile phone terminal device 100, and a state in which the display panel 121 is covered with the palm of the hand is reached, as shown in FIG. 3B. At this time, the touch-panel unit 130 detects that the palm of the hand is touched (step S103). When the touch-panel unit 130 detects that the palm of the hand has been touched, the touch-panel unit 130 deactivates the ordinary coordinate detection of the touch operation (step S104). Then, the touch-panel unit 130 transmits the detection report of the hand's palm touch to the control unit 110 (step S105). The control unit 110 receiving the detection report of the hand's palm touch switches off the display of the display panel 121 (step S106), and changes the operation mode to a motion input mode.

When the motion input mode is entered, the control unit 110 sends an instruction for activating an acceleration sensor and a gyro sensor to the motion sensor unit 108 (step S201). The motion sensor unit 108 upon receiving this instruction, on the basis of the output of the gyro unit 108a and the acceleration sensor 108b, detects the inclination and the motion of the mobile phone terminal device 100 (step S202), and transmits the report of the detection result to the control unit 110 (step S203).

The control unit 110 upon receiving the report of the inclination and the motion of the mobile phone terminal device 100 converts the gesture resulting from the motion or the inclination indicated by the received report into a key signal that instructs performance of an operation (step S204). Then, the control unit 110 supplies the converted key signal to the short-distance wireless communication processing unit 107 (step S205). The short-distance wireless communication processing unit 107 to which this key signal has been transmitted generates a control signal for wireless transmission corresponding to the key signal, and wirelessly transmits this control signal to the display device 200 (step S206).

The display device 200 upon receiving this control signal judges the content of the control signal, and performs a process for the video displayed on the display panel 211. For example, the control unit 203 of the display device 200 performs a process for changing the position of the pointer that is displayed in such a manner as to be superimposed on the video.

The process of FIG. 5 is an example in which, during the motion input mode, a control signal is transmitted from the mobile phone terminal device 100 to the display device 200, and the video is changed in the display device 200 on the basis of the motion and the inclination that are detected by the motion sensor unit 108.

In contrast, during the motion input mode, the video to be output by the mobile phone terminal device 100 may be changed on the basis of the motion and the inclination that are detected by the motion sensor unit 108.

Figure 6:
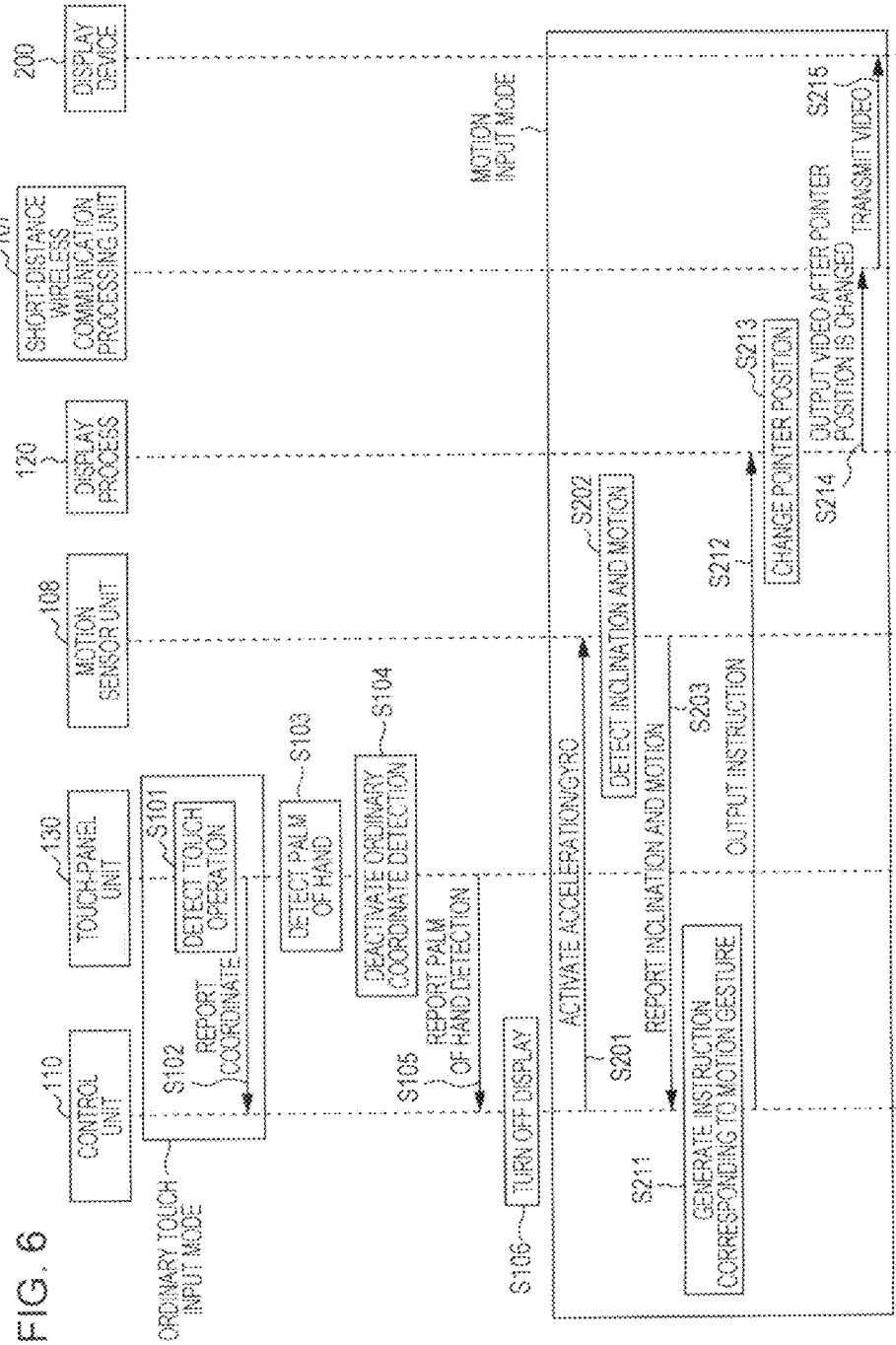
FIG. 6 illustrates another example (example of changing output video) of the flow of the control state according to the first embodiment of the present disclosure.

FIG. 6 illustrates a flow of the process in this case.

The processing from step S101 to step S106, and the processing from step S201 to step S203 in FIG. 6 are the same as the processing shown in FIG. 5. Then, the control unit 110 upon receiving the report of the detection results of the inclination and the motion of the mobile phone terminal device 100 in step S203 generates an instruction based on the report (step S211). The instruction generated by the control unit 110 is sent to the display processing unit 120 (step S212). For example, the control unit 110 instructs the change of the position of the pointer in the video. The video processing unit 120 upon receiving this instruction changes the position of the pointer of the video being generated. Then, the video processing unit 120 generates a video in which the pointer position has been changed (step S213), and supplies the video after the pointer position change to the short-distance wireless communication processing unit 107 (step S214).

Then, the short-distance wireless communication processing unit 107 modulates the supplied video data to that for wireless transmission, and wirelessly transmits the data to the display device 200 (step S215). The display device 200 performs a process for displaying the received video data.

In FIG. 6, only the transmission of the video data after the pointer position change is shown as steps S214 and S215. In a state in which the wireless connection between the mobile phone terminal device 100 and the display device 200 is completed, the wireless transmission of the video data is constantly performed.

Figure 7:
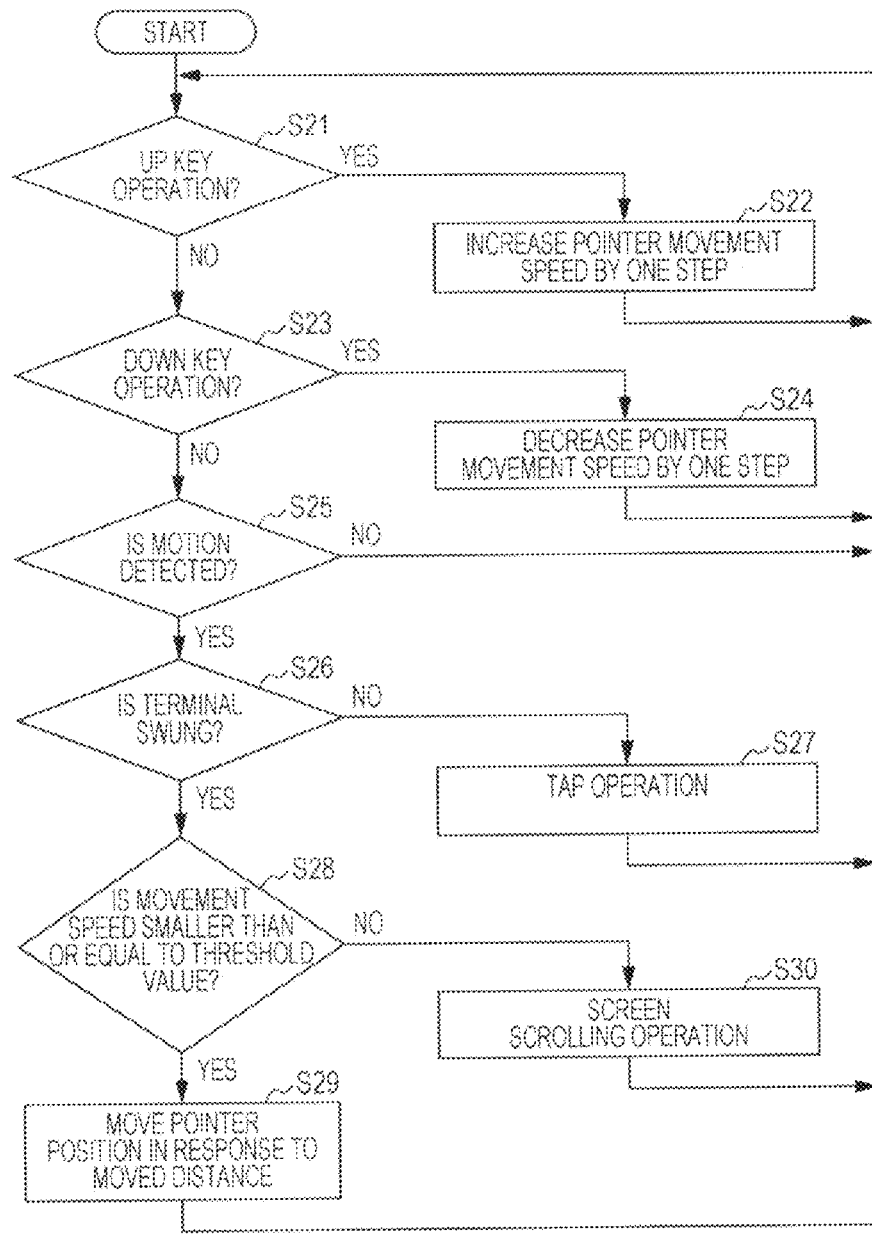
FIG. 7 is a flowchart illustrating a processing example for each operation according to the first embodiment of the present disclosure.

FIG. 7 illustrates processing in which the control unit 110 receiving the report of the detection results of the inclination and the motion from the motion sensor unit 108 generates an instruction for performing processing regarding a video. The flowchart of FIG. 7 is processing performed in step S204 of FIG. 5 and in step S211 of FIG. 6.

First, the control unit 110 determines whether or not there is an operation of an up key (operation key 144: FIG. 2) (step S21). When it is determined in this determination that there is an operation of the up key, the control unit 110 increases by one step the movement speed of the pointer in the motion input mode (step S22).

Then, when it is determined in step S21 that there is no operation of the up key, the control unit 110 determines whether or not there is an operation of a down key (operation key 145: FIG. 2) (step S22). When it is determined in this determination that there is an operation of the down key, the control unit 110 decreases by one step the movement speed of the pointer in the motion input mode (step S24).

Then, when it is determined in the determination of step S22 that there is no operation of the down key, the control unit 110 determines whether or not a motion has been detected on the basis of the report from the motion sensor unit 108 (step S25). When it is determined in this determination that a motion has been detected, the control unit 110 determines whether or not a motion of being swung, in which the orientation of the mobile phone terminal device 100 is changed, has been detected (step S26). When a motion of being swung, in which the orientation of the mobile phone terminal device 100 has been changed, has been detected in this determination, the control unit 110 generates an instruction corresponding to a tap operation (step S27). Then, when a motion of being swung has not been detected, the control unit 110 determines whether or not the detected speed of the motion is a movement speed smaller than or equal to a predetermined threshold value (step S28).

When a motion in which the movement speed is smaller than or equal to the threshold value has been detected in step S28, an instruction for moving the position of the pointer in the video is generated on the basis of the movement distance of the motion detected by the motion sensor unit 108 (step S29).

Furthermore, when a motion in which the movement speed is smaller than or equal to the threshold value has been detected in step S28, the control unit 110 generates an instruction for scrolling the screen in the moved direction (step S30).

Then, after processes of steps S22, S24, S27, and S29 are performed, the control unit 110 returns to the determination of step S21. Furthermore, when it is determined in step S25 that no motion has been detected, the control unit 110 returns to the determination of step S21.

[1-4. Examples of Specific Operations and Displays]

Next, specific change examples of video, which are performed in the processing shown in the flowchart of FIG. 7 will be described with reference to FIGS. 8 (A-C) to 10 (A and B).

Figure 8A:
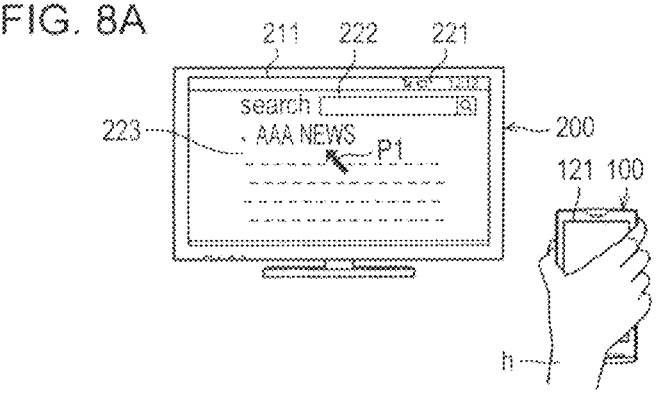
FIGS. 8A-8C illustrate change examples of operations and display videos according to the first embodiment of the present disclosure.
Figure 8B:
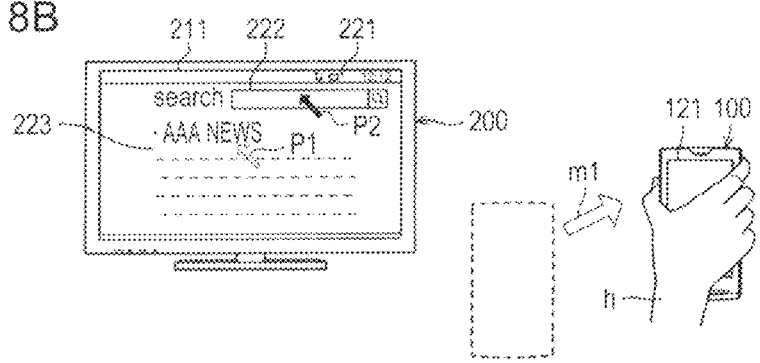
Figure 8C:
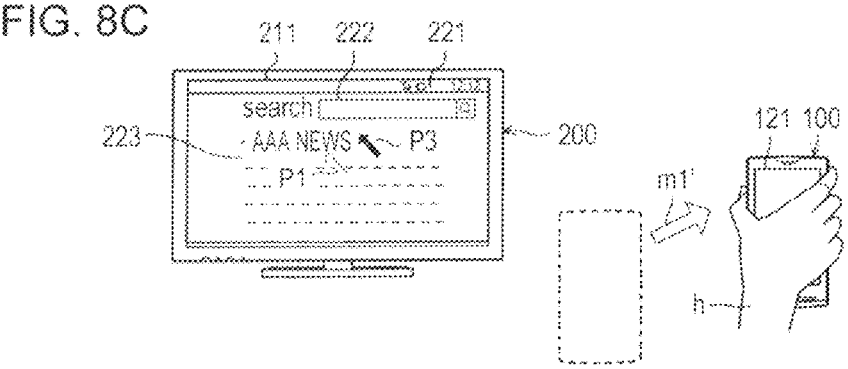

FIGS. 8A-8C illustrate examples in which the position of the pointer in the video displayed by the display device 200 is operated by the motion of the mobile phone terminal device 100. All the states shown in FIGS. 8A, B, and C are states in which the display panel 211 of the display device 200 displays the video output from the mobile phone terminal device 100. Furthermore, the states shown in FIGS. 8A, B, and C are states in which the display panel 121 of the mobile phone terminal device 100 is covered with the hand of the user. In this state, the mobile phone terminal device 100 is operating in the motion input mode.

The example of FIG. 8A is an example in which the display panel 211 of the display device 200 displays the video of the home page of a certain site. The display video of this example contains a status bar 221, a search character input place 222, and a news display place 223. The status bar 221 displays the state of the mobile phone terminal device 100. Furthermore, a pointer P1 pointing to a specific place in the video is displayed in nearly the center of the video.

Then, at such a display state, by moving the mobile phone terminal device 100 by the user, the display position of the pointer P1 is changed. For example, as shown in FIG. 8B, when the user performs a motion m1 of moving the mobile phone terminal device 100 to the upper right, in synchronization with the motion m1 to the upper right, the pointer P1 in nearly the center is changed to a pointer P2 at a position in the upper right. The amount of movement of the pointer P1 to P2 is proportional to the amount of movement of the motion m1 of the mobile phone terminal device 100.

The relationship between the amount that the mobile phone terminal device 100 has moved and the amount of motion of the pointer on the screen can be adjusted by the user by operating the up key and the down key. That is, as described in the flowchart of FIG. 7, when the up key is operated, the movement speed of the pointer increases, and when the down key is operated, the movement speed of the pointer decreases.

FIG. 8C illustrates an example in which the movement speed is adjusted to be lower than that in the state of FIG. 8B. As shown in FIG. 8C, when the user performs substantially the same motion m1' as in the state of FIG. 8B in which the mobile phone terminal device 100 is moved to the upper right, the pointer P1 in nearly the center is changed to a pointer P3, in which the amount of movement is smaller than that of the pointer P2 of FIG. 8B.

The process for superimposing the pointer in the display video may be performed by the display device 200 and performed by the mobile phone terminal device 100. The flow of the process, shown in FIG. 5, is an example in which the display device 200 performs a process for superimposing the pointer in the display video, and the flow of the process, shown in FIG. 6, is an example in which the mobile phone terminal device 100 performs a process for superimposing the pointer in the display video.

The process for instructing the movement of the pointer with the motion of the mobile phone terminal device 100, which is shown in FIG. 8, is a case in which the user moves the mobile phone terminal device 100 at a comparatively slow speed. On the other hand, in a case where the user moves the mobile phone terminal device 100 at a comparatively fast speed, an operation differing from the movement of the pointer is performed. The speed determination is performed in step S26 of the flowchart of FIG. 7. The threshold value of the speed for determination may be made to be able to be changed by user setting.

Figure 9A:
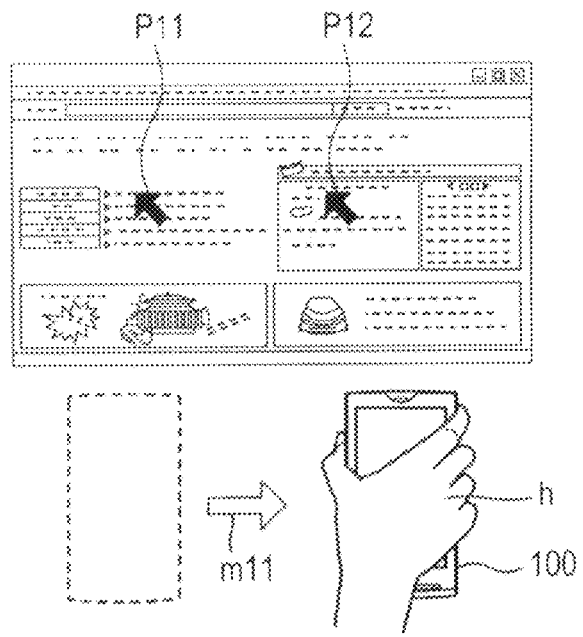
FIGS. 9A and 9B illustrate other change examples of operations and display videos according to the first embodiment of the present disclosure.
Figure 9B:
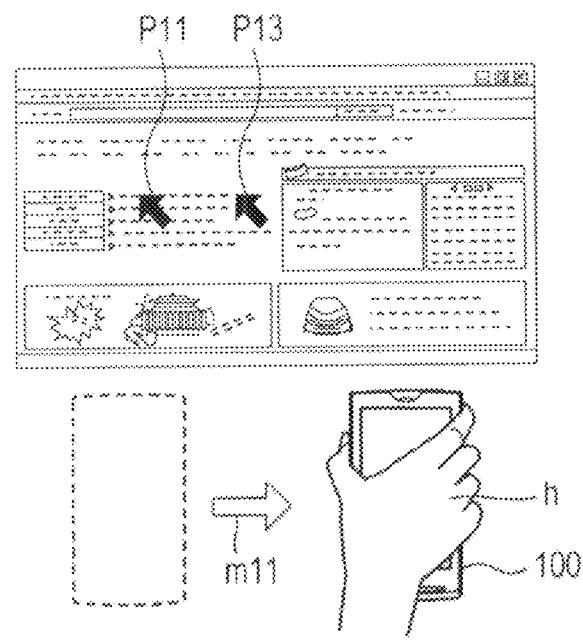

FIGS. 9A and 9B illustrate other examples showing states in which the movement speed is changed by the operation of the up key and the down key.

FIG. 9A illustrates a case in which an operation of the up key is performed. In this case, when there is a motion m11 of a fixed distance in the horizontal direction with respect to the mobile phone terminal device 100, a pointer P11 on the screen is changed to a pointer P12 at a position moved more than the position before the up key was operated. The speed at which the display position of the pointer moves increases in response to the number of times the up key is pressed.

FIG. 9B illustrates an example in which the down key is operated in the same situation as that of FIG. 9A. In this case, when there is a motion m11 of a fixed distance in the horizontal direction with respect to the mobile phone terminal device 100, the pointer P11 on the screen is changed to a pointer P13 at a position before the down key was operated. The speed at which the display position of the pointer moves decreases in response to the number of times the up key is pressed.

As described above, the movement speed can be adjusted by operating the up key and the down key, making it possible to easily perform an operation of adjusting the pointer (cursor) on the screen to a fine icon on the screen. The operation keys 144 and 145 serving as an up key and a down key are keys arranged on the side surface of the housing, as shown in FIG. 2. It is possible for the user to satisfactorily perform operations by using fingers comparatively easily in a state in which the display panel is covered with the hand h of the user.

Figure 10A:
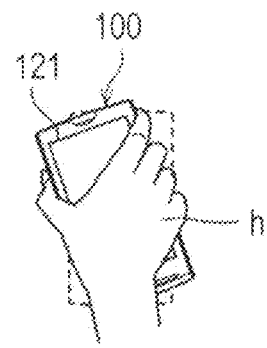
FIGS. 10A and 10B are illustrations illustrating a tap operation and scroll operations according to the first embodiment of the present disclosure.
Figure 10B:
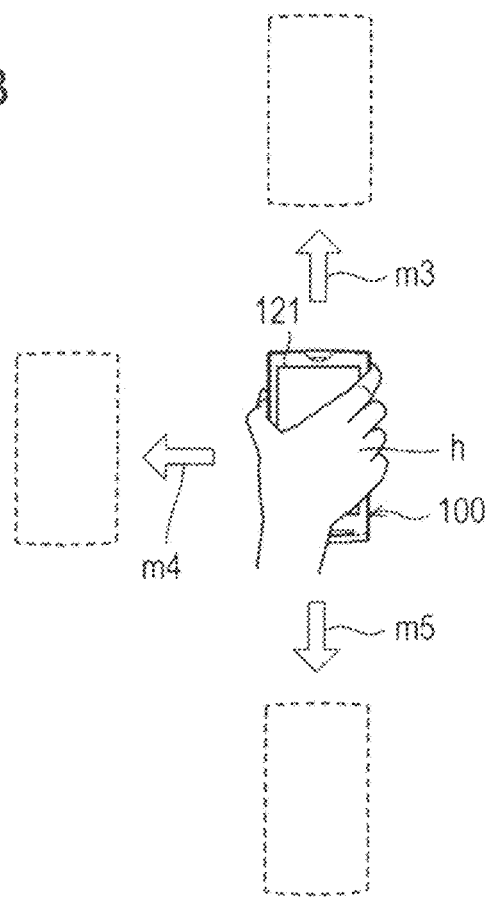

FIGS. 10A and 10B illustrate examples of the motion of the mobile phone terminal device 100 in a case where the user moves the mobile phone terminal device 100 at a comparatively fast speed.

FIG. 10A illustrates an example when the user performs a motion m2 of inclining the mobile phone terminal device 100 at a comparatively fast speed. At this time, upon the detection of a comparatively high-speed motion m2 involving the inclination in the motion sensor unit 108 of the mobile phone terminal device 100, the control unit 110 performs an instruction for a tap operation. A tap operation is an operation of selecting a specific place on the screen. For example, as shown in FIG. 8B, the user performs a tap operation in a state in which the pointer P2 points to a search character input place 222. Consequently, the character input place is selected, and the display panel 211 displays a screen for performing character input.

FIG. 10B illustrates examples of cases where the user moves the mobile phone terminal device 100 up and down or side by side at a comparatively fast speed. For example, when the motion sensor unit 108 detects a motion m3 at which the mobile phone terminal device 100 is moved upward at a comparatively fast speed, the control unit 110 performs an upward scroll instruction on the screen. As a result of performing this upward scroll instruction, the video displayed on the display panel 211 of the display device 200 is scrolled in an upward direction.

In a similar manner, when the user performs a motion m4 in the horizontal direction or a motion m5 in the downward direction, the scroll in the horizontal direction or the scroll in the downward direction of the video displayed on the display panel 211 of the display device 200 is performed.

By changing the way of moving the mobile phone terminal device 100 by the user in a state in which the display panel 121 of the mobile phone terminal device 100 is covered with fingers and the palm of the hand as described above, it is possible to perform an operation of moving the pointer, a tap operation, an operation of scrolling the entire screen.

Furthermore, when the movement of the pointer is to be performed, adjustment of a speed is possible by operating the up key and the down key. Thus, an operation with high accuracy in which the intent of the user is reflected becomes possible.

Furthermore, switching from the ordinary touch input mode to the motion input mode is performed by only covering the display panel 121 of the mobile phone terminal device 100 with fingers and the palm of the hand. Consequently, mode switching can be performed easily by only passing the mobile phone terminal device 100 from one hand to the other by the user.

<2. Second Embodiment>
[2-1. Control Process Based on Operation]

Figure 11:
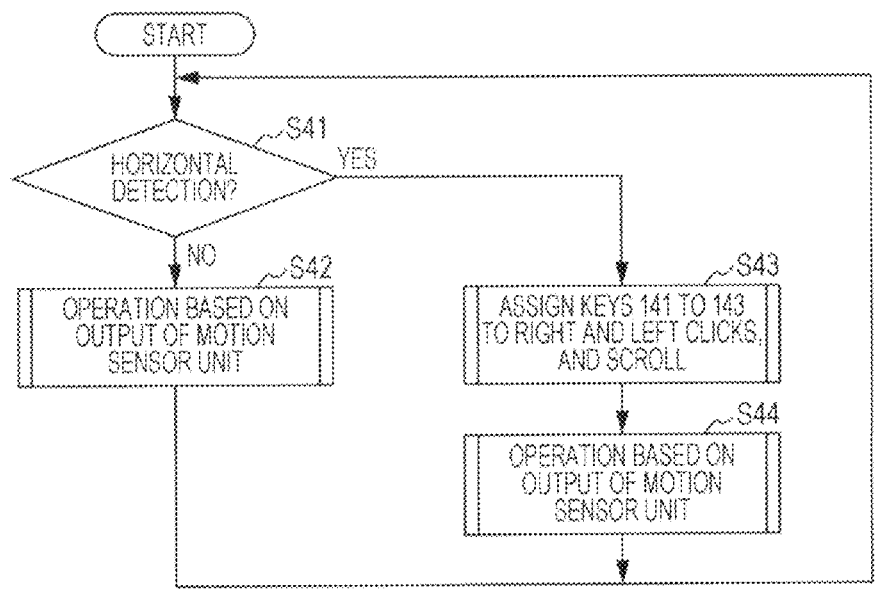
FIG. 11 is a flowchart illustrating a control example according to a second embodiment of the present disclosure.

An example of a second embodiment will be described with reference to FIGS. 11 to 12 (A and B). In FIGS. 11 to 12 (A and B), the same components as those in FIGS. 1 to 10 described earlier in the first embodiment are designated with the same reference numerals, and detailed description thereof is omitted.

The example of the second embodiment differs from the first embodiment in the control state in which the mobile phone terminal device 100 and the display device 200 are connected to each other, and the mobile phone terminal device 100 is placed in a motion input mode. For the configuration of the mobile phone terminal device 100 and the display device 200, the configuration shown FIGS. 1 and 2, which are described earlier in the first embodiment, is applied.

The flowchart of FIG. 11 illustrates processing performed by the control unit 110 during the motion input mode in the second embodiment. The mode shifts to a motion input mode when, as described in the first embodiment, a fixed area or more of the display panel 121 of the mobile phone terminal device 100 is covered with fingers and the palm of the hand.

As shown in FIG. 11, when the mode goes to the motion input mode, the control unit 110 determines whether or not the mobile phone terminal device 100 is in a horizontal state on the basis of the detection state of the motion sensor unit 108 (step S41). When it is determined here that the mobile phone terminal device 100 is not in a horizontal state, the control unit 110 performs an operation instruction based on the detection output of the motion sensor unit 108 (step S42). For the process for performing an operation instruction based on the detection output of the motion sensor unit 108, for example, the process shown in the flowchart of FIG. 7 can be applied. Furthermore, at this time, the three operation keys 141, 142, and 143 arranged on the surface of the mobile phone terminal device 100 are assumed to be keys having pre-assigned functions.

Then, when it is determined in step S41 that the mobile phone terminal device 100 is nearly in a horizontal state, the control unit 110 assigns the three operation keys 141, 142, and 143 arranged on the surface of the mobile phone terminal device 100 to right and left click operations and a scroll operation (step S43). Then, the position instructed by the control unit 110 is changed in response to the motion of the mobile phone terminal device 100, which is detected by the motion sensor unit 108 (step S44).

After the processes of steps S42 and S44 are performed, the control unit 110 returns to the determination of step S41.

[2-2. Examples of Specific Operations]

Figure 12A:
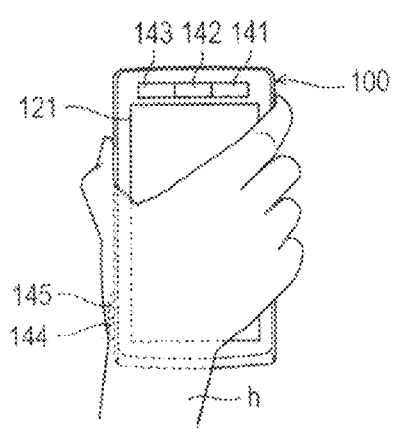
FIGS. 12A and 12B are illustrations illustrating operation examples according to the second embodiment of the present disclosure.
Figure 12B:
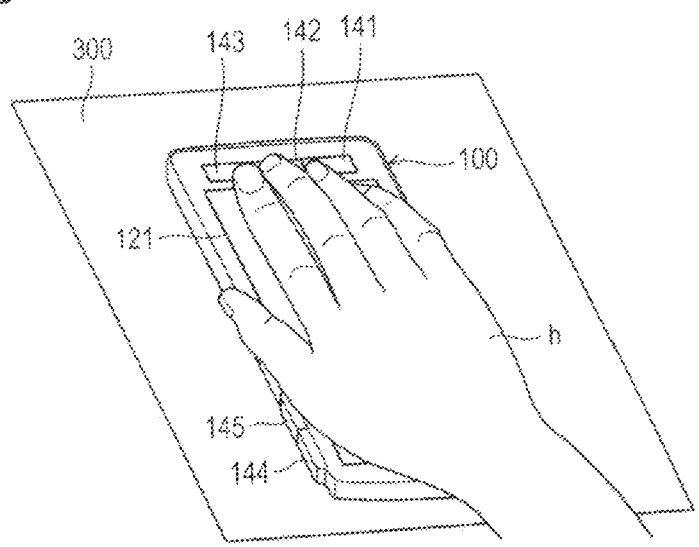

FIGS. 12A and 12B illustrate a state (FIG. 12A) in which the surface of the display panel 121 is covered with fingers and the palm of the hand in a state in which the user holds the mobile phone terminal device 100, and a state (FIG. 12B) in which the display panel 121 of the mobile phone terminal device 100 that is placed nearly horizontally is covered with fingers and the palm of the hand.

As shown in FIG. 12A, in a state in which the mobile phone terminal device 100 is held by the hand h of the user, the display panel 121 is in a nearly upright state. At this time, similarly to the case that has already been described in the example of the first embodiment, an operation instruction regarding the displayed video is performed in response to the motion and the inclination detected by the motion sensor unit 108.

Then, as shown in FIG. 12B, in a state in which the mobile phone terminal device 100 is placed horizontally on the table 300 and user's fingers and the palm of the hand are placed on the display panel 121, the three keys 141, 142, and 143 are assigned to right and left click operation keys and a scroll operation key. Specifically, the key 141 is designated as a right click operation key, the key 142 is designated as a scroll operation key, and the key 143 is designated as a left click operation key. At this time, the orientation in which the mobile phone terminal device 100 is arranged is an orientation in which the keys 141, 142, and 143 are oriented upward.

As a result of the keys 141 to 143 being assigned as described above, the mobile phone terminal device 100 performs the same operation as that of a pointing device, such as a mouse. That is, as shown in FIG. 12B, in a state in which fingers and the palm of the hand are placed on the display panel 121, the user performs an operation of pressing the keys 141 to 143 with the tip ends of the three fingers and also, the position of the mobile phone terminal device 100 is moved, making it possible to perform the same instruction as that by the mouse.

In the state shown in FIG. 12B, fingers and the palm of the hand become slightly away from the surface of the display panel 121. However, since the touch-panel unit 130 detects an approach of fingers even in an away state, the touch-panel unit 130 can detect that the mobile phone terminal device 100 is in a state of being covered.

By performing operations with the mobile phone terminal device 100 being placed horizontally as shown in FIG. 12B, the pointer in the video displayed on the display panel 211 of the display device 200 can be moved, or a click operation or a scroll operation can be performed. Thus, operations like a mouse are made possible.

When the assignment of the three keys 141 to 143 are to be changed, the two keys 144 and 145 (up key and down key) arranged on the side surface of the mobile phone terminal device 100 may also be changed to keys having more ease of use.

Furthermore, in the flowchart of FIG. 11, even when the mobile phone terminal device 100 is not in a horizontal state shown in FIG. 12A, operations are performed by assuming the mode to be a motion input mode. Alternatively, only when the mobile phone terminal device 100 is in a horizontal state shown in FIG. 12B, operations are performed by assuming the mode to be a motion input mode.

Furthermore, in the example of the second embodiment, in the same way as in the example of the first embodiment, a case in which the mobile phone terminal device 100 and the display device 200 are wirelessly connected to each other has been described. In contrast, the device of another party that performs the instruction from the mobile phone terminal device 100 may be a device other than the display device. For example, the mobile phone terminal device 100 may wirelessly transmit an instruction based on a motion or a key operation to a personal computer device. As a result of the above, the mobile phone terminal device 100 functions as a mouse for a personal computer device.

<3. Modifications>

In the above-described embodiments, examples of cases in which the display device 200 displays the same video as the video displayed by the display panel 121 of the mobile phone terminal device 100 have been described. In contrast, the present disclosure may be applied to a case in which the display device 200 displays a video different from the video displayed by the display panel 121 of the mobile phone terminal device 100.

Figure 13A:
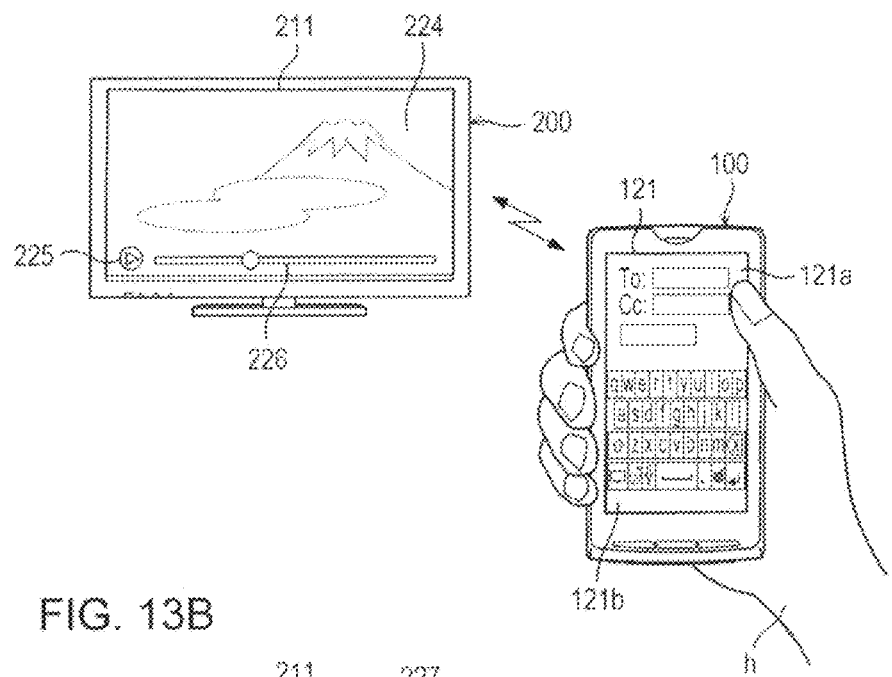
FIGS. 13A and 13B are illustrations illustrating operation states according to a modification of the embodiment of the present disclosure.

For example, as shown in FIG. 13A, a state is assumed in which the display panel 211 of the display device 200 displays a video 224 of content downloaded by the mobile phone terminal device 100, and the display panel 121 of the mobile phone terminal device 100 displays an electronic mail creation screen.

The video 224 displayed by the display device 200 is attached with a playback button 225, a playback position display 226, and the like. Examples of screens displayed by the mobile phone terminal device 100 include an input screen 121a and a keyboard screen 121b.

Figure 13B:
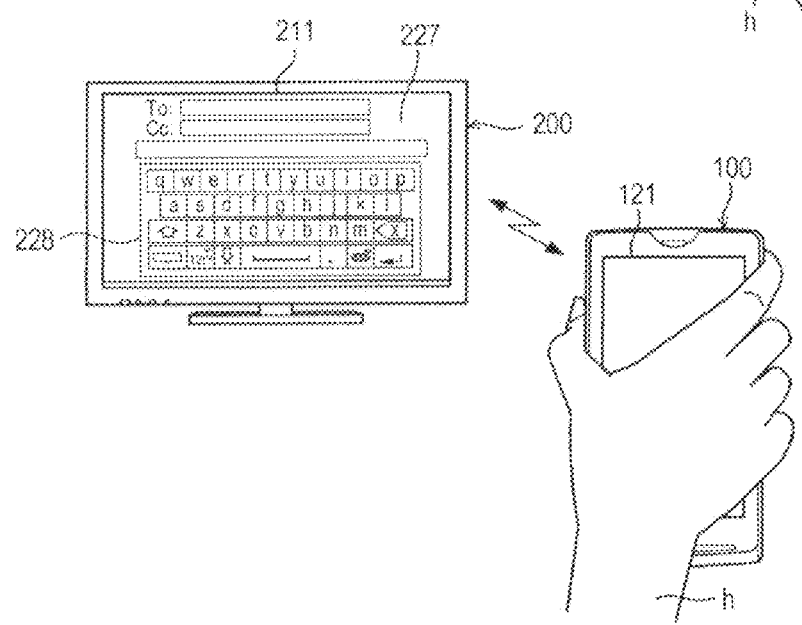

In such a state, for example, it is assumed that the user changes the way of holding the mobile phone terminal device 100, and as shown in FIG. 13B, fingers and the palm of the hand are positioned on the surface of the display panel 121 of the mobile phone terminal device 100. At this time, in the mobile phone terminal device 100, a motion input mode is set, the display of the display panel 121 is switched off and also, the video output by the mobile phone terminal device 100 is switched from the playback video of the video content to an electronic mail creation video.

As a result of the above, the display panel 211 of the display device 200 displays an electronic mail input screen 228, and a keyboard screen 229. Then, by moving the mobile phone terminal device 100, it becomes possible for the user to perform a selection operation for character input or the like.

In the example of FIG. 13B, in the display device 200, the display of the video content is completely erased, and only the electronic mail creation screen is displayed. In contrast, the display of the video content and the display of the electronic mail creation screen may be performed at the same time.

Furthermore, in each of the above-described embodiments, an example of the case in which the mobile phone terminal device 100 configured as a smartphone and the display device 200 configured as a television receiver are connected to each other has been described. In contrast, the present disclosure may be applied to a case in which another terminal apparatus and another display device are connected to each other.

Furthermore, in each of the above-described embodiments, the terminal apparatus and the display device are wirelessly connected to each other, and the display device displays a video. In contrast, the same processing may be performed in a case where a terminal apparatus and a display device are connected to each other through a wire cable, and the display device displays a video transmitted from the terminal apparatus.

In the case of this connection by a wire cable, for example, processing performed by the short-distance wireless communication processing unit 107 shown in FIG. 5 or 6 becomes processing performed by the input/output processing unit 160. It is possible for the input/output processing unit 160 to perform processing in a case where communication in the terminal part 170 to which a cable of the HDMI standard is connected is controlled, and a display device to which the cable of the HDMI standard is connected performs display.

Furthermore, programs (software) for performing control processing, described in the flowcharts of FIGS. 4, 7 and 11, may be generated, and the programs may be stored on a recording medium. A terminal apparatus, in which the programs are installed by preparing the programs stored on the recording medium, becomes a terminal apparatus that performs the processing of the present disclosure.

The configurations and processes disclosed in the claims of the present disclosure are not limited to the above-described embodiments. It should be understood of course by those skilled in the art that various modifications, combinations, and other exemplary embodiments may be made according to design and/or other factors insofar as they come within the scope of the claims or the equivalents thereof.

The present disclosure can take the following configurations.

(1) A terminal apparatus including
a display panel arranged on a housing;
a display processing unit that processes an image displayed on the display panel;
an output unit that externally outputs the image processed by the display processing unit or an instruction regarding the image;
a touch-panel that detects a contact or approach of an object with or toward a surface of the display panel;
a motion sensor that detects a motion of the housing; and
a control unit having circuitry that when the touch-panel detects the contact or approach of the object having a greater size than or equal to a predetermined size, controls the output unit to output an image or an instruction corresponding to the motion detected by the motion sensor.

(2) The terminal apparatus of (1), wherein when the control unit detects that the contact or approach of the object of greater than or equal to the predetermined size, the control unit deactivates the touch-panel from detecting further contact or approach of the object.

(3) The terminal apparatus of 1, wherein when the control unit detects that the contact or approach of the object of greater than or equal to the predetermined size, the control unit activates the motion sensor to detect the motion of the housing.

(4) The terminal apparatus of 3, wherein the control unit identifies a movement of the housing that is not a swinging movement as corresponding to a tap operation that selects a specific location on the display panel.

(5) The terminal apparatus of 3, wherein the control unit identifies a swing of the housing as being a scrolling operation on the display panel when a movement speed of the housing is not smaller than or equal to a threshold value.

(6) The terminal apparatus of 3, wherein the control unit identifies a swing of the housing as being a request to move a pointer position on the display panel when a movement speed of the housing is smaller than or equal to a threshold value.

(7) The terminal apparatus of 6, wherein the control unit causes the pointer position to move by an amount that corresponds to a movement amount of the housing.

(8) The terminal apparatus of 7, wherein
after the pointer position has been moved, the control unit determines that an operation other than movement of the pointer is performed in response to the housing being moved faster than the threshold value.

(9) The terminal apparatus of 1, wherein
the control unit responds to an inclination movement of the housing by performing a tap operation that selects a specific location on the display panel.

(10) The terminal apparatus of 1, wherein
the control unit responds to an up-and-down or a side-to-side movement of the housing by performing a scrolling operation on the display panel.

(11) The terminal apparatus of 1, further comprising:
a plurality of keys, wherein
when the control unit determines that a user's palm is placed on the touch-panel, actuation of the plurality of keys is recognized as a pointing device.

(12) The terminal apparatus of 11, wherein
the control unit recognizes actuation of a predetermined key as a left-click operation.

(13) The terminal apparatus of 11, wherein
the control unit recognizes actuation of a predetermined key as a right-click operation.

(14) The terminal apparatus of 11, wherein
the control unit recognizes actuation of a predetermined key as a scroll operation.

(15) The terminal apparatus of 1, wherein
the control unit is configured to erase the image of the display panel and insert an image of an electronic mail creation screen.

(16) The terminal apparatus of 15, wherein
the control unit outputs the instruction to create an e-mail message in response to motions detected by the motion sensor.

(17) A display method including
displaying an image on a display panel arranged on a housing;
processing with a display processing unit the image displayed on the display panel;
externally outputting the image processed by the display processing unit or an instruction regarding the image;
detecting on a touch-panel a contact or approach of an object with or toward a surface of the display panel;
detecting with a motion sensor a motion of the housing; and
performing with a control unit having circuitry when the touch-panel detects the contact or approach of the object having a greater size than or equal to a predetermined size, a control of the output unit to output an image or an instruction corresponding to the motion detected by the motion sensor.

(18) The method of 17, wherein
the detecting includes detecting the contact or approach of the object of greater than or equal to the predetermined size and deactivating the touch-panel from detecting further contact or approach of the object.

(19) The method of 17, wherein
the detecting includes detecting the contact or approach of the object of greater than or equal to the predetermined size and activating the motion sensor to detect the motion of the housing.

(20) A non-transitory computer readable storage device having computer readable instructions that when executed by processing circuitry cause the processing circuitry to implement a display method, the method including
displaying an image on a display panel arranged on a housing;
processing with a display processing unit the image displayed on the display panel;
externally outputting the image processed by the display processing unit or an instruction regarding the image;
detecting on a touch-panel a contact or approach of an object with or toward a surface of the display panel;
detecting with a motion sensor a motion of the housing; and
performing with a control unit having circuitry when the touch-panel detects the contact or approach of the object having a greater size than or equal to a predetermined size, a control of the output unit to output an image or an instruction corresponding to the motion detected by the motion sensor.

[Reference Signs List]
100 . . . mobile phone terminal device, 101 . . . antenna, 102 . . . wireless communication processing unit, 103 . . . audio processing unit, 104 . . . speaker, 105 . . . microphone, 106 . . . antenna, 107 . . . short-distance wireless communication processing unit, 108 . . . motion sensor unit, 108a . . . gyro unit, 108b . . . acceleration sensor unit, 110 . . . control unit, 120 . . . display processing unit, 121 . . . display panel, 130 . . . touch-panel unit, 141 to 145 . . . operation key, 160 . . . input/output processing unit, 170 . . . terminal part, 200 . . . display device, 201 . . . terminal part, 202 . . . switching unit, 203 . . . control unit, 204 . . . tuner, 205 . . . antenna, 206 . . . short-distance wireless communication processing unit, 210 . . . display unit, 211 . . . display panel, and 300 . . . table

The invention claimed is:

1. A terminal apparatus comprising:
a display panel arranged on a housing;
a display processing unit that processes an image displayed on the display panel;
an output unit that externally outputs the image processed by the display processing unit or an instruction regarding the image to an external device;
a touch-panel that detects a contact or approach of an object with or toward a surface of the display panel;
a motion sensor that detects a motion of the housing; and
a control unit having circuitry that when the touch-panel detects the contact or approach of the object having a greater size than or equal to a predetermined size, controls the output unit to output an image or an instruction corresponding to the motion detected by the motion sensor,
wherein when the control unit detects the contact or approach of the object of greater than or equal to a predetermined size, the control unit deactivates the touch-panel from detecting further contact or approach of the object in response to the output unit being activated to control an image on the external device based on a motion of the housing.

2. The terminal apparatus of claim 1, wherein
the control unit responds to an inclination movement of the housing by performing a tap operation that selects a specific location on the display panel.

3. The terminal apparatus of claim 1, wherein
the control unit responds to an up-and-down or a side-to-side movement of the housing by performing a scrolling operation on the display panel.

4. The terminal apparatus of claim 1, wherein when the control unit detects the contact or approach of the object of greater than or equal to the predetermined size, the control unit activates the motion sensor to detect the motion of the housing.

5. The terminal apparatus of claim 4, wherein
the control unit identifies a movement of the housing that is not a swinging movement as corresponding to a tap operation that selects a specific location on the display panel.

6. The terminal apparatus of claim 4, wherein the control unit identifies a swing of the housing as being a scrolling operation on the display panel when a movement speed of the housing is not smaller than or equal to a threshold value.

7. The terminal apparatus of claim 4, wherein the control unit identifies a swing of the housing as being a request to move a pointer position on the display panel when a movement speed of the housing is smaller than or equal to a threshold value.

8. The terminal apparatus of claim 7, wherein the control unit causes the pointer position to move by an amount that corresponds to a movement amount of the housing.

9. The terminal apparatus of claim 8, wherein
after the pointer position has been moved, the control unit determines that an operation other than movement of the pointer is performed in response to the housing being moved faster than the threshold value.

10. The terminal apparatus of claim 1, further comprising:
a plurality of keys, wherein
when the control unit determines that a user's palm is placed on the touch-panel, actuation of the plurality of keys is recognized as a pointing device.

11. The terminal apparatus of claim 10, wherein
the control unit recognizes actuation of a predetermined key as a left-click operation.

12. The terminal apparatus of claim 10, wherein
the control unit recognizes actuation of a predetermined key as a right-click operation.

13. The terminal apparatus of claim 10, wherein
the control unit recognizes actuation of a predetermined key as a scroll operation.

14. The terminal apparatus of claim 1, wherein
the control unit is configured to erase the image of the display panel and insert an image of an electronic mail creation screen.

15. The terminal apparatus of claim 14, wherein
the control unit outputs the instruction to create an e-mail message in response to motions detected by the motion sensor.

16. A display method comprising:
displaying an image on a display panel arranged on a housing;
processing with a display processing unit the image displayed on the display panel;
externally outputting the image processed by the display processing unit or an instruction regarding the image to an external device;
detecting on a touch-panel a contact or approach of an object with or toward a surface of the display panel;
detecting with a motion sensor a motion of the housing; and
performing with a control unit having circuitry when the touch-panel detects the contact or approach of the object having a greater size than or equal to a predetermined size, a control of the output unit to output an image or an instruction corresponding to the motion detected by the motion sensor,
wherein when the control unit detects the contact or approach of the object of greater than or equal to a predetermined size, the control unit deactivates the touch-panel from detecting further contact or approach of the object in response to the output unit being activated to control an image on the external device based on a motion of the housing.

17. The method of claim 16, wherein
the detecting includes detecting the contact or approach of the object of greater than or equal to the predetermined size and activating the motion sensor to detect the motion of the housing.

18. A non-transitory computer readable storage device having computer readable instruction that when executed by processing circuitry cause the processing circuitry to implement a display method, the method comprising:
displaying an image on a display panel arranged on a housing;
processing with a display processing unit the image displayed on the display panel;
externally outputting the image processed by the display processing unit or an instruction regarding the image to an external device;
detecting on a touch-panel a contact or approach of an object with or toward a surface of the display panel;
detecting with a motion sensor a motion of the housing; and
performing with a control unit having circuitry when the touch-panel detects the contact or approach of the object having a greater size than or equal to a predetermined size, a control of the output unit to output an image or an instruction corresponding to the motion detected by the motion sensor, wherein when the control unit detects the contact or approach of the object of greater than or equal to a predetermined size, the control unit deactivates the touch-panel from detecting further contact or approach of the object in response to the output unit being activated to control an image on the external device based on a motion of the housing.

* * * * *